No. 11,882. Reissued Jan. 8, 1901.

M. J. O'MEARA.

FIREPROOF FLOOR CONSTRUCTION.

(Application filed Dec. 6, 1900.)

2 Sheets—Sheet 1.

Witnesses:
M. H. Miles
Alex. Scott

Inventor:
M. J. O'Meara,
By Thomas S. Thomas,
his Attys

No. 11,882. Reissued Jan. 8, 1901.

M. J. O'MEARA.

FIREPROOF FLOOR CONSTRUCTION.

(Application filed Dec. 6, 1900.)

2 Sheets—Sheet 2.

Witnesses:
M. H. Miller
Alex. Scott

Inventor:
M. J. O'Meara,
By Howson & Howson,
his Attys.

UNITED STATES PATENT OFFICE.

MICHAEL J. O'MEARA, OF PHILADELPHIA, PENNSYLVANIA.

FIREPROOF FLOOR CONSTRUCTION.

SPECIFICATION forming part of Reissued Letters Patent No. 11,882, dated January 8, 1901.

Original No. 662,808, dated November 27, 1900. Application for reissue filed December 6, 1900. Serial No. 38,879.

*To all whom it may concern:*

Be it known that I, MICHAEL J. O'MEARA, a citizen of the United States, residing in Philadelphia, Pennsylvania, have invented certain Improvements in Fireproof Floor Construction, of which the following is a specification.

My invention relates to that class of fireproof floor construction in which hollow lintels of fire-clay or other suitable material are employed; and it consists of certain improvements in the lintels used therewith whereby I am enabled to strengthen the latter, such improved form of lintel permitting the use, if desired, of a metallic reinforce.

My invention also includes the reinforcing of the cement or mortar used as a filling in and between the lintels and the combination of this structure with the improved form of lintel provided with the metallic reinforce.

My invention is fully illustrated in the accompanying drawings, in which—

Figure 1:
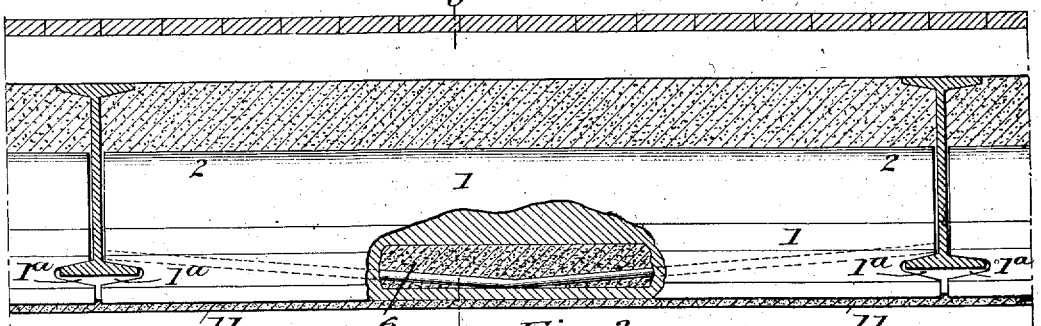
Figure 3:
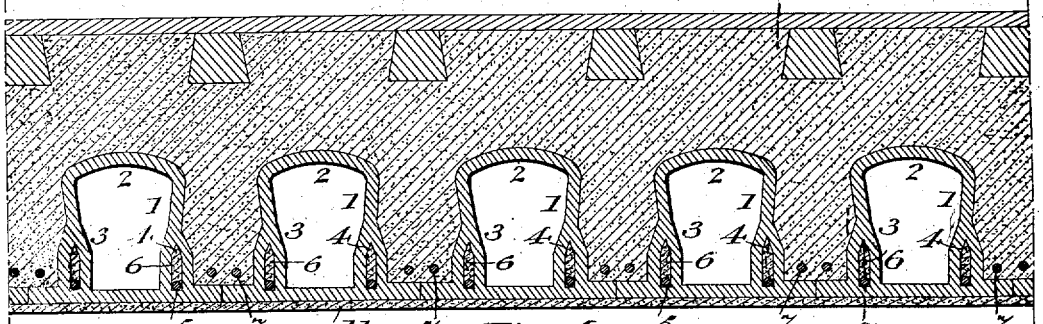
Figure 4:
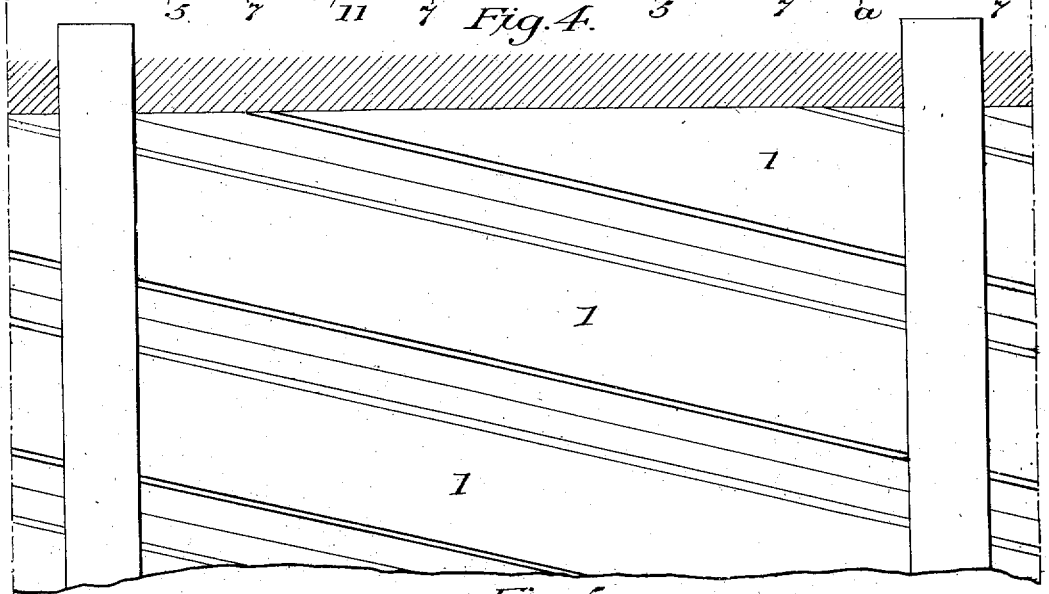
Figure 5:
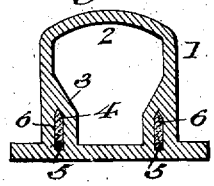
Figure 2:
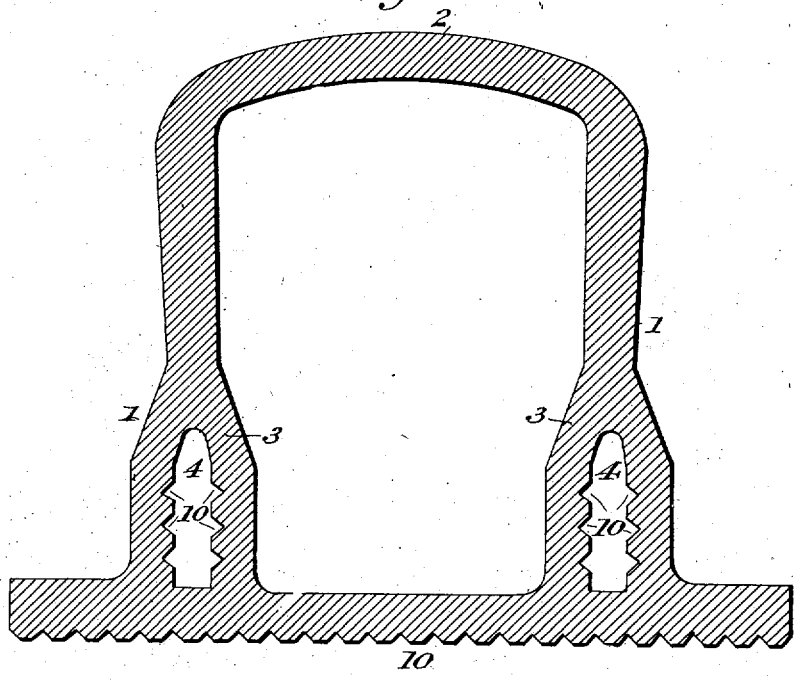
Figure 6:
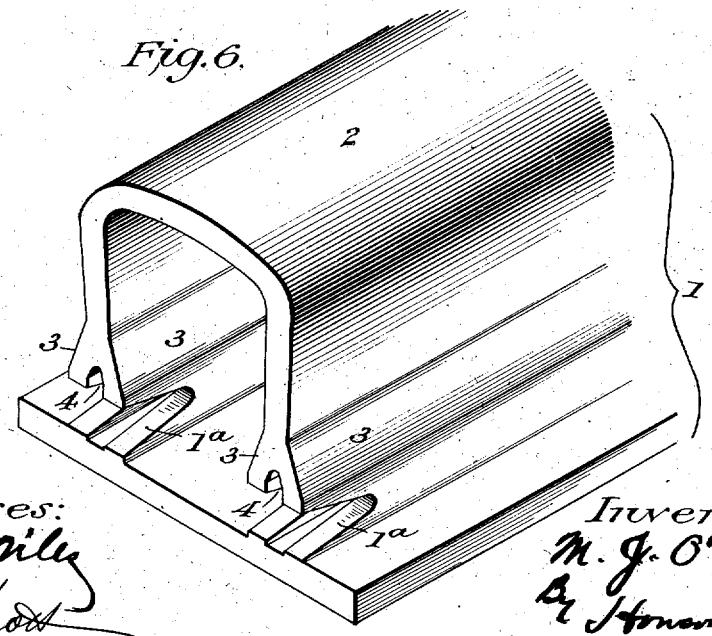

Figure 1 is a sectional view of the improved fireproof floor construction, taken on the line *a a*, Fig. 2, showing in side elevation and partly in section the improved style of lintel forming a part of my invention. Fig. 2 is a sectional view, on an enlarged scale, of the lintel forming a part of my invention. Fig. 3 is a sectional view of the improved fireproof floor construction, taken on the line *b b*, Fig. 1, showing the shape of the lintels and the manner in which the metallic reinforce is introduced both in the lintel and in the cement filling or grouting. Fig. 4 is a plan view of the floor construction before the cement is introduced, showing the manner in which the lintels are arranged. Fig. 5 is a sectional view of a modified form of lintel, and Fig. 6 is a perspective view of the end of one of the lintels.

In the form of fireproof floors to which my invention is applied the lintels serve as a support for the cement only when the latter is drying. When dry, it becomes self-supporting, and the lintels act as non-conductors of heat during fire, thereby preventing the disintegration of the cement. The ordinary form of lintel used in floor construction of this general character has side walls of the same thickness as the top arched portion and base portion of the lintels, and I have found that such lintels when recessed at the ends, as shown in Fig. 1, to fit the flanges of the beams have a tendency to break on a line extending vertically from the end of the recess. This tendency to shear off is augmented as the filling material to form the floor structure is set in place, and the lintel which I use in my improved floor construction has been designed with a special view of increasing the strength of the side walls of the same, thereby overcoming the tendency of the lintel to shear at the notched ends. I provide for this increased strength of the lintel by having the side walls hollow, and the point where they are notched to fit the beams has a bearing-surface nearly three times greater than the usual side walls of lintels of this character. As an additional means of increasing the strength of the lintel a metallic reinforce may be disposed within the receptacle formed by the hollow portion of the side walls.

In the drawings, 1 represents the lintels, having arched tops 2 and hollow side walls 3, said lintels being also recessed at $1^a$, as usual, to fit the flanges of the beams. The double side walls provide an additional bearing-surface at the notched portions $1^a$, and the longitudinal spaces 4 permit the introduction of a metallic reinforce, preferably in the shape of a tie-rod 5. These rods when used may be arranged as shown in Fig. 1 or disposed in any suitable manner, so long as they serve to assist in taking up strains which would otherwise fall upon the lintel. The space 4 is preferably filled with a cement grouting 6, and when the reinforcing-rods 5 are used such grouting holds said rods securely in place.

Instead of solid wire rods, rods made of twisted wire may be employed.

In addition to the rods 5, carried by the lintels, I may arrange rods 7 in the cement filling between the lintels. These rods are clearly seen in Fig. 2, where they are shown as disposed between the lintels. If desired, more than one rod may be used at this point, and they may be truss or inverted truss form; the object being to stiffen the floor structure and prevent the breaking of the lintels.

In the form of lintel shown at Figs. 2 and 3 the upper walls are inclined toward the center, while the lower portion of said side wall, which is double, is vertical. This arrangement is not essential, and in Fig. 5 I have shown a modified form of lintel with straight hollow side walls provided with longitudinal spaces 4.

The improved lintels made in accordance with my invention are preferably grooved on the under side, as shown at 10, Fig. 2, for the purpose of affording a better holding-surface for the ceiling-plaster 11, and the inner surfaces of the spaces 4 of the hollow side walls are grooved at $10^a$, as seen also in Fig. 2. This feature is not illustrated in Figs. 3 and 5, since these views are too small to show the same clearly.

I claim as my invention—

1. In a fireproof floor structure, the combination of the floor-beams, hollow lintels supported by the flanges of said beams, said lintels having arched tops, flat bottom portions and side walls of an inverted-Y shape in cross-section, the double portions of said walls joining the bottom portion of the lintels, and filling material disposed between said lintels.

2. In a fireproof floor structure, the combination of the floor-beams, hollow lintels supported by the flanges of said beams, said lintels having arched tops, flat bottom portions and side walls of an inverted-Y shape in cross-section, the double portions of said walls joining the bottom portion of the lintels, filling material disposed between said lintels, and a metallic reinforce arranged within said filling material.

3. In a fireproof floor structure, the combination of the floor-beams, hollow lintels supported by the flanges of said beams, said lintels having arched tops, flat bottom portions and side walls of an inverted-Y shape in cross-section, said side walls being recessed to fit the beam-flanges at the point where they join the bottom portion of the lintel, said notches being made in the double portion of the wall whereby an increased bearing-surface for the lintel is provided, and filling material disposed between said lintels.

4. In a fireproof floor structure, the combination of the floor-beams, hollow lintels supported by the flanges of said beams, said lintels having arched tops, flat bottom portions and side walls of an inverted-Y shape in cross-section, said side walls being recessed to fit the beam-flanges at the point where they join the bottom portion of the lintel, said notches being made in the double portion of the wall whereby an increased bearing-surface for the lintels is provided, filling material disposed between said lintels, and a metallic reinforce arranged within said filling material.

5. In a fireproof floor structure, the combination of the floor-beams, hollow lintels supported by the flanges of said beams, said lintels having hollow walls, metallic reinforcing rods or wires adapted to said hollow walls, and suitable filling material for holding said rods or wires in place.

6. In a fireproof floor structure, the combination of the floor-beams, hollow lintels supported by the flanges of said beams, said lintels having hollow walls, metallic reinforcing rods or wires adapted to said hollow walls, filling material for holding said rods or wires in place, and filling material disposed between said lintels.

7. In a fireproof floor structure of the character described a lintel having hollow side walls, the spaces formed in said walls adapted to receive metallic reinforces with a grouting to hold such reinforces in place, the inner walls of said spaces being scored or grooved whereby the grouting placed therein will be keyed in place, substantially as described.

8. As a new article of manufacture, a hollow lintel for fireproof floor construction having an arched top, a flat bottom portion and side walls of an inverted-Y shape in cross-section.

9. As a new article of manufacture, a hollow lintel for fireproof floor construction having an arched top, a flat bottom portion and side walls of an inverted-Y shape in cross-section, said walls being recessed to fit the beam-flanges.

10. As a new article of manufacture, a hollow lintel for fireproof floor construction having hollow side walls for the reception of a metallic reinforce, with provision for retaining said reinforce in place.

11. As a new article of manufacture, a hollow lintel for fireproof floor construction, said lintel having hollow side walls for the reception of metallic wires or rods and notched portions at the ends of said lintels through which said rods or wires may project, with provision for retaining said rods or wires in place.

In testimony whereof I have signed my name to this specification in the presence of two subscribing witnesses.

MICHAEL J. O'MEARA.

Witnesses:
MURRAY C. BOYER,
JOS. H. KLEIN.